United States Patent
Naruse et al.

(10) Patent No.: US 10,599,369 B2
(45) Date of Patent: *Mar. 24, 2020

(54) PRINT SYSTEM, PRINT APPARATUS, CONTROL METHOD, AND STORAGE MEDIUM

(71) Applicant: CANON KABUSHIKI KAISHA, Tokyo (JP)

(72) Inventors: Taketomo Naruse, Yokohama (JP); Ryohei Saito, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/383,339

(22) Filed: Apr. 12, 2019

(65) Prior Publication Data

US 2019/0235799 A1    Aug. 1, 2019

Related U.S. Application Data

(63) Continuation of application No. 16/030,399, filed on Jul. 9, 2018, now Pat. No. 10,310,777.

(30) Foreign Application Priority Data

Jul. 13, 2017    (JP) ................. 2017-136750

(51) Int. Cl.
*G06F 3/12*     (2006.01)
*H04W 28/02*   (2009.01)
(Continued)

(52) U.S. Cl.
CPC .......... *G06F 3/1204* (2013.01); *G06F 3/1236* (2013.01); *G06F 3/1259* (2013.01); *G06F 3/1268* (2013.01); *G06F 3/1292* (2013.01); *G06F 3/1294* (2013.01); *G06F 3/167* (2013.01); *H04W 28/0205* (2013.01); *G06F 3/1205* (2013.01); *H04W 8/005* (2013.01); *H04W 84/12* (2013.01); *H04W 88/10* (2013.01)

(58) Field of Classification Search
CPC ...... G06F 3/1204; G06F 3/167; G06F 3/1268; G06F 3/1292; G06F 3/1236; G06F 3/1259; G06F 3/1294; G06F 3/1205; H04W 28/0205; H04W 84/12; H04W 8/005; H04W 88/10
See application file for complete search history.

(56) References Cited

U.S. PATENT DOCUMENTS

2012/0182432 A1   7/2012   Okamoto
2012/0243024 A1*   9/2012   Miyata ............... H04N 1/00244
                                                       358/1.13
(Continued)

FOREIGN PATENT DOCUMENTS

JP    2003-051887 A    2/2003
JP    2012-094088 A    5/2012
(Continued)

*Primary Examiner* — Neil R McLean
(74) *Attorney, Agent, or Firm* — Canon U.S.A., Inc. IP Division

(57) ABSTRACT

An audio control device receives a print instruction by audio and causes a print apparatus connected to an external access point to execute a print process in accordance with the print instruction received by audio.

37 Claims, 18 Drawing Sheets

(51) Int. Cl.
*G06F 3/16* (2006.01)
*H04W 88/10* (2009.01)
*H04W 8/00* (2009.01)
*H04W 84/12* (2009.01)

(56) References Cited

U.S. PATENT DOCUMENTS

| | | | | |
|---|---|---|---|---|
| 2015/0189488 A1* | 7/2015 | Yamashita | ............... | H04L 67/12 |
| | | | | 370/310 |
| 2016/0162227 A1* | 6/2016 | Kato | ..................... | G06F 3/1227 |
| | | | | 358/1.13 |
| 2017/0064594 A1* | 3/2017 | Larsen | .................... | H04W 4/80 |

FOREIGN PATENT DOCUMENTS

| | | |
|---|---|---|
| JP | 2016-103168 A | 6/2016 |
| JP | 2017-068575 A | 4/2017 |

* cited by examiner

| MAKER | SERVER COOPERATION | SETTING METHOD | COOPERATION SERVER |
|---|---|---|---|
| A COMPANY | ○ | SCREEN DISPLAY | SERVER A |
| B COMPANY | ○ | INVITATION PAGE | SERVER B |
| C COMPANY | ○ | MOBILE TERMINAL | SERVER C |
| D COMPANY | × | × | × |
| E COMPANY | ○ | SCREEN DISPLAY | SERVER E |

PRINT SYSTEM, PRINT APPARATUS, CONTROL METHOD, AND STORAGE MEDIUM

CROSS REFERENCE TO RELATED APPLICATIONS

The present application is a continuation of U.S. patent application Ser. No. 16/020,399, filed on Jul. 9, 2018, which claims priority from Japanese Patent Application No. 2017-136750 filed Jul. 13, 2017, which is hereby incorporated by reference herein in its entirety.

BACKGROUND OF THE INVENTION

Field of the Invention

The present invention relates to a print system, a print apparatus, a control method, and a storage medium.

Description of the Related Art

A technique of executing a print instruction by pressing a print button displayed in a mobile terminal is disclosed in Japanese Patent Laid-Open No. 2015-100020.

However, in Japanese Patent Laid-Open No. 2015-100020, a user requires to press a print button to instruct printing. In recent years, print apparatuses have been used in various situations and a technique of further improving operability of a print instruction is demanded.

SUMMARY OF THE INVENTION

According to an embodiment of the present disclosure, there is provided a print apparatus capable of communicating with an audio control device capable of receiving an instruction by audio, wherein the audio control device is capable of executing a first reception process of receiving information on an external access point from a terminal apparatus through a first wireless communication and a second reception process of receiving information on the external access point from the terminal apparatus through a second wireless communication, a communication speed of the first wireless communication is faster than that of the second wireless communication, including a wireless connection unit configured to communicate to the external access point to which the audio control device connects based on the information on the external access point received in the first reception process or the second reception process, an obtaining unit configured to obtain, via the external access point, a print data generated by that the audio control device receives a print instruction by audio, and a printing unit configured to print based on the print data.

Further features of the present invention will become apparent from the following description of exemplary embodiments with reference to the attached drawings.

DESCRIPTION OF THE EMBODIMENTS

First Embodiment

Figure 1:
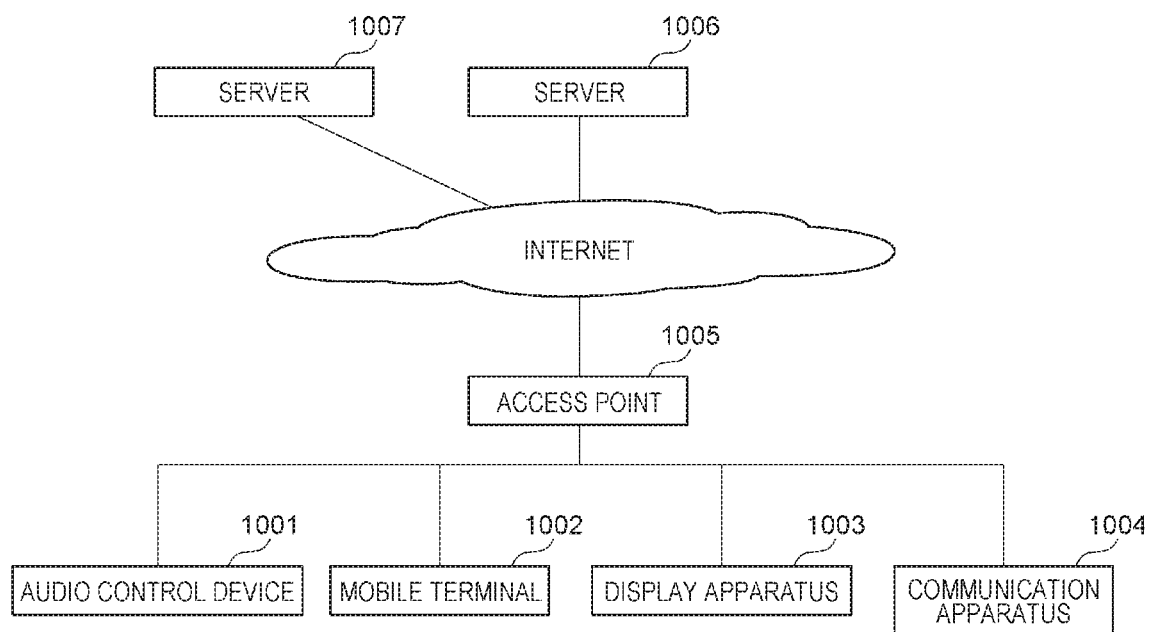
FIG. 1 is a diagram illustrating an example of a system configuration.

FIG. 1 is a diagram illustrating a system configuration according to a first embodiment. The system of this embodiment includes an audio control device 1001, a mobile terminal 1002, a display apparatus 1003, a communication apparatus 1004, an access point (AP) 1005, and a server 1006, for example. The audio control device 1001 is a smart speaker, for example. The mobile terminal 1002 is arbitrarily selected from among a smart phone, a laptop personal computer (PC), a tablet terminal, and a personal digital assistant (PDA). Note that the mobile terminal 1002 is a smartphone hereinafter. Furthermore, the mobile terminal is referred to as a terminal apparatus where appropriate. The communication apparatus 1004 is a printer, for example, or may be a photocopier, a facsimile apparatus, a digital still camera, or the like. Furthermore, the communication apparatus 1004 may be a multifunction peripheral having a plurality of functions including a copy function, a FAX function, and a print function. Note that the communication apparatus 1004 is a printer such as an inkjet printer, a full-color laser beam printer, or a monochrome printer hereinafter.

The audio control device 1001 to the communication apparatus 1004 are connectable to (available for communication with) the server 1006 through the AP 1005 and the Internet. Furthermore, the audio control device 1001 to the communication apparatus 1004 are connectable to (available for communication with) one another through the AP 1005.

Figure 2:
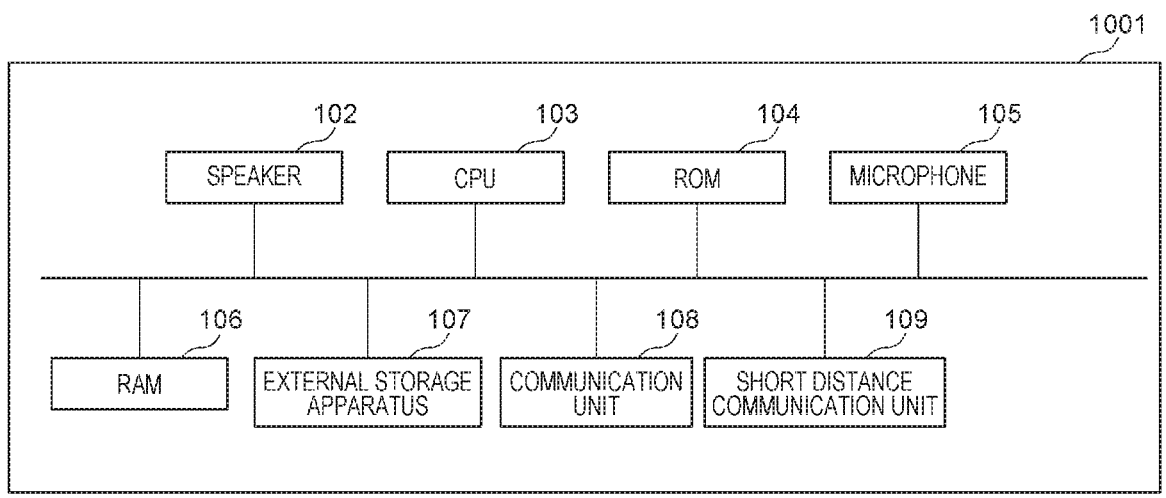
FIG. 2 is a diagram illustrating an example of a hardware configuration of an audio control device.

FIG. 2 is a diagram illustrating a hardware configuration of the audio control device 1001. The audio control device 1001 includes a speaker 102, a central processing unit (CPU) 103, a read only memory (ROM) 104, a microphone 105, a random access memory (RAM) 106, an external storage apparatus 107, a communication unit 108, and a short distance communication unit 109. Note that blocks illustrated in FIGS. 2 to 4 and FIG. 8 are connected to one another through an internal bus, for example. Note that the configuration is merely an example, and the apparatuses may include hardware other than that illustrated. Furthermore, in FIGS. 2 to 4 and FIG. 8, a number of the blocks may be collected to one block or one of the blocks may be divided into two or more blocks. Specifically, the apparatuses may have arbitrary configurations in a range in which processes described below may be executed.

The speaker 102 generates sound by a process described below. The CPU 103 is a system controller which controls the entire audio control device 1001. The ROM 104 stores fixed data such as control programs to be executed by the CPU 103, data tables, and programs of an embedded operating system (OS). In this embodiment, various control programs stored in the ROM 104 are used to perform software execution control, such as scheduling, a task switching, and an interruption process under control of the embedded OS stored in the ROM 104. The microphone 105 receives sound near the audio control device 1001. The RAM 106 includes a static RAM (SRAM) which requires a backup power source, for example. Note that data is stored using a primary battery for data backup, not illustrated, and therefore, the RAM 106 may store data, such as program control variables, in a non-volatile state. Furthermore, a memory area which stores setting information of the audio control device 1001, management data, and the like is also included in the RAM 106. Furthermore, the RAM 106 is also used as a main memory and a work memory of the CPU 103. The external storage apparatus 107 stores application software.

The communication unit 108 includes a circuit and an antenna for performing communication in accordance with a certain wireless communication method. The communication unit 108 may be connected to the AP 1005 in a wireless manner. Furthermore, the communication unit 108 may operate as an AP which is temporarily used. Note that the AP 1005 may be a wireless local area network (LAN) router, for example. The wireless communication used in this embodiment may be capable of operating in accordance with a wireless communication method of a wireless LAN based on the IEEE802.11 standard series or may be capable of operating in accordance with another wireless communication method.

The short distance communication unit 109 executes short distance communication with other apparatuses included in a certain near-field range of the audio control device 1001. Note that the short distance communication unit 109 performs communication based on a wireless communication method different from that employed in the communication unit 108. The short distance communication unit 109 operates in accordance with the Bluetooth (registered trademark) standard in this embodiment. Furthermore, a communication speed of the wireless communication using the communication unit 108 is faster than that of the short distance communication using the short distance communication unit 109 in this embodiment. Furthermore, a communication range of the wireless communication using the communication unit 108 is larger than that of the short distance communication using the short distance communication unit 109 in this embodiment. Note that this is true of communication units and short distance communication units in other apparatuses described below.

Figure 3:
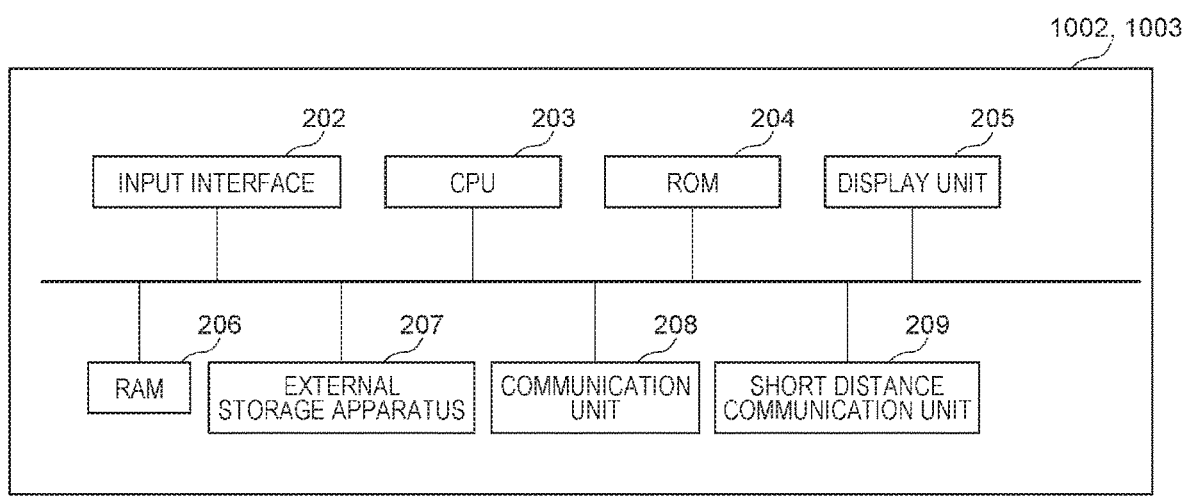
FIG. 3 is a diagram illustrating an example of a hardware configuration of a mobile terminal and a display apparatus.

FIG. 3 is a diagram illustrating an example of a hardware configuration of the mobile terminal 1002 and the display apparatus 1003. Each of the mobile terminal 1002 and the display apparatus 1003 includes an input interface 202, a CPU 203, a ROM 204, a display unit 205, a RAM 206, an external storage apparatus 207, a communication unit 208, and a short distance communication unit 209, for example. Note that these blocks are connected to one another through an internal bus, for example.

The CPU 203 is a system controller which controls the entire apparatus. As with the RAM 106, for example, the RAM 206 includes a dynamic RAM (DRAM) which requires a backup power source. Furthermore, the RAM 206 is also used as a main memory and a work memory of the CPU 203. The ROM 204 stores fixed data such as control programs to be executed by the CPU 203, data tables, and OS programs.

The communication unit 208 has functions the same as those of the communication unit 108 described above and enables wireless connection to other apparatuses through the AP 1005. The short distance communication unit 209 may perform short distance communication with the short distance communication unit 109 using the wireless communication method employed in the short distance communication unit 109.

Figure 4:
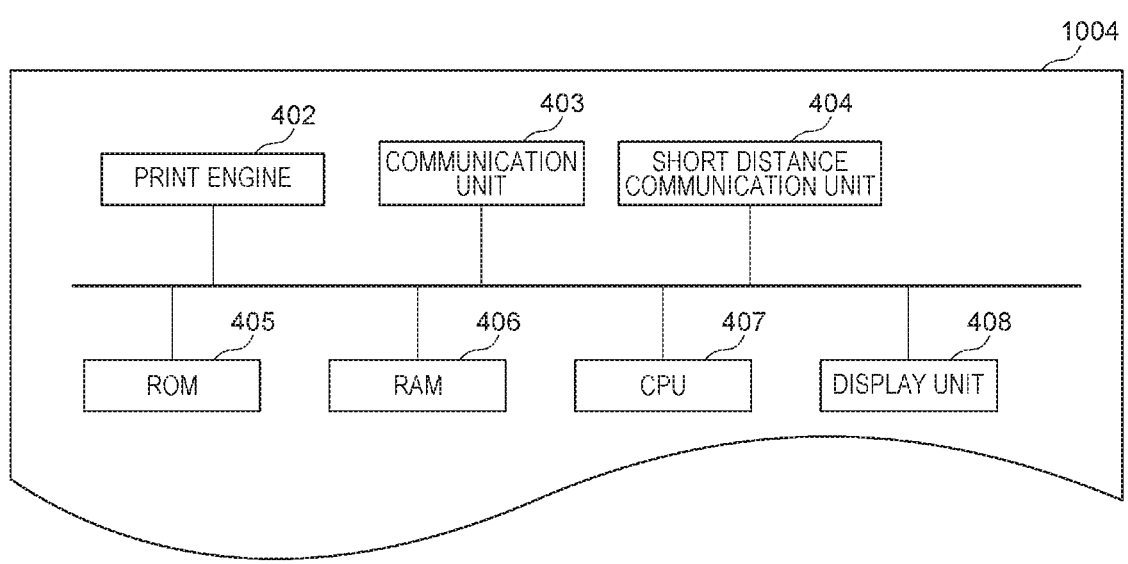
FIG. 4 is a diagram illustrating an example of a hardware configuration of a communication apparatus.
Figure 5A:
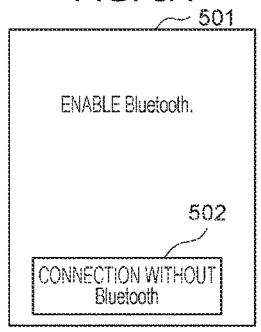
FIGS. 5A to 5H are diagrams illustrating examples of screens associated with setup of an audio control device.
Figure 5B:
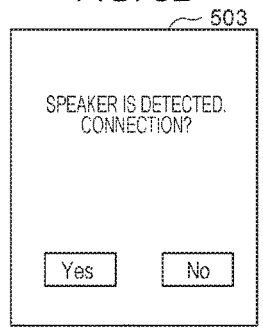
Figure 5C:
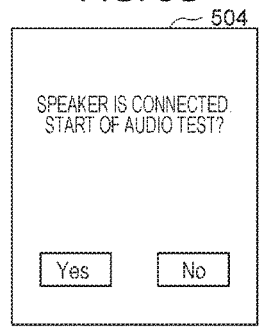
Figure 5D:
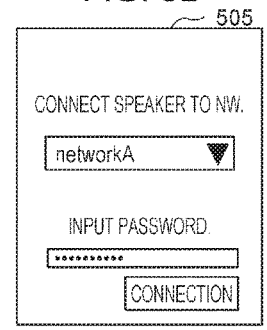
Figure 5E:
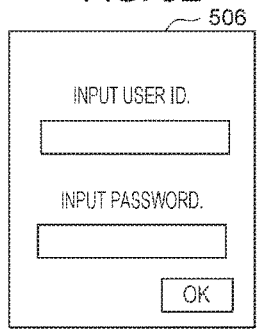
Figure 5F:
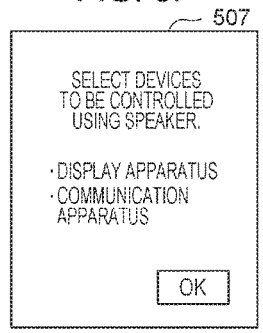
Figure 5G:
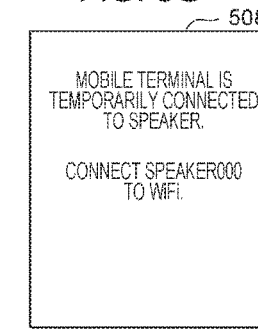
Figure 5H:
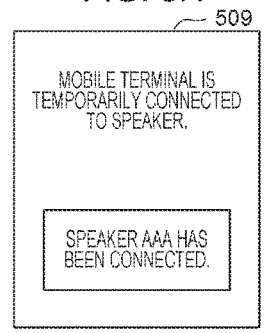

FIG. 4 is a diagram illustrating a hardware configuration of the communication apparatus 1004. The communication apparatus 1004 includes a print engine 402, a communication unit 403, a short distance communication unit 404, a ROM 405, a RAM 406, a CPU 407, and a display unit 408.

The CPU 407 is a system controller which controls the entire communication apparatus 1004. As with the RAM 106, for example, the RAM 406 is constituted by a dynamic RAM (DRAM) which requires a backup power source. Furthermore, the RAM 406 is also used as a main memory and a work memory of the CPU 407. The ROM 405 stores fixed data such as control programs to be executed by the CPU 407, data tables, and OS programs.

The communication unit 403 has functions the same as those of the communication unit 108 described above and may be wirelessly connected to the apparatuses through the AP 1005. The short distance communication unit 404 may perform short distance communication with the short distance communication unit 109 using the wireless communication method employed in the short distance communication unit 109.

The print engine 402 forms an image on a recording medium, such as a sheet, using recording material, such as ink, based on a print job received through the communication unit 403 and outputs a printing result.

The display unit 408 is an interface for accepting a data input and an operation instruction performed by the user and is an operation panel including a physical keyboard, buttons, and a touch panel.

Next, setup of the audio control device 1001 will be described. Examples of screens displayed for the setup of the audio control device 1001 in the mobile terminal 1002 are illustrated in FIGS. 5A to 5H.

The mobile terminal 1002 includes a management application for the audio control device 1001 installed therein in advance.

The user activates the management application so that a screen 501 is displayed in the display unit 205 of the mobile terminal 1002. Here, the user enables the short distance communication unit 209 (Bluetooth, for example) of the mobile terminal 1002 in accordance with a message described in the screen 501. When the audio control device 1001 is activated, the audio control device 1001 generates a beacon including a specific identifier. The mobile terminal 1002 displays a screen 503 when detecting the beacon generated by the audio control device 1001 using the management application. When a button "Yes" is pressed in the screen 503, the mobile terminal 1002 and the audio control device 1001 establish short distance connection. When the short distance connection between the mobile terminal 1002 and the audio control device 1001 is established, a screen 504 is displayed in the display unit 205 of the mobile terminal 1002. Here, when the user presses a button "Yes" in the screen 504, audio data is transmitted from the mobile terminal 1002 to the audio control device 1001 through the short distance connection and audio is output from the speaker 102 of the audio control device 1001. When the audio is output from the audio control device 1001, the user presses a test completion button displayed after the screen 504 so that a screen 505 is displayed in the display unit 205 of the mobile terminal 1002. Here, the user inputs an SSID and a password of an AP to which the audio control device 1001 is to be connected in a screen 505 and presses a connection button. Basically, the user inputs an SSID and a password of the AP 1005 which is wirelessly connected to the mobile terminal 1002 through the communication unit 208 in the screen 505. By this process, the mobile terminal 1002 transmits the SSID and the password to the audio control device 1001 through the short distance connection. The audio control device 1001 establishes wireless connection with the AP 1005 using the SSID and the password which are received through the short distance connection. By the process described above, the audio control device 1001 and the mobile terminal 1002 may be wirelessly connected with each other through the AP 1005. Subsequently, the user inputs a user ID and a password for login to the server 1006 in a screen 506 displayed in the mobile terminal 1002. Note that the user ID and the password input in the screen 506 are transmitted from the mobile terminal 1002 to the audio control device 1001 via the short distance connection or the AP 1005. The audio control device 1001 signs in to the server 1006 using the user ID and the password received from the mobile terminal 1002. In this case, the audio control device 1001 transmits a MAC address of the audio control device 1001. By this, the audio control device 1001 may use a service which is provided by the server 1006 for the user. Specifically, the server 1006 manages a MAC address and a user ID of the audio control device 1001 which are associated with each other. The audio control device 1001 may receive an access token of the server 1006. The user selects a device to be controlled using the audio control device 1001 in a screen 507 displayed after the screen 506. It is assumed here that the user select the display apparatus 1003 and the communication apparatus 1004. The devices are displayed in the screen 507 when the mobile terminal 1002 searches for the devices through the AP 1005. In this case, as a result of the device searching process, the mobile terminal 1002 obtains MAC addresses and IP addresses of the devices when the device searching is performed. Therefore, when an OK button is pressed in the screen 507, the mobile terminal 1002 transmits the MAC addresses and the IP addresses of the devices to the audio control device 1001.

Note that the setup of the audio control device 1001 may be performed by another method. For example, when the audio control device 1001 is activated (or when a setup mode is enabled), the communication unit 108 of the audio control device 1001 operates as a software AP. When a button "Connection without Bluetooth" 502 is pressed in the screen 501, for example, the mobile terminal 1002 establishes wireless connection with the audio control device 1001 through the communication unit 208. For example, when the communication unit 208 of the mobile terminal 1002 has been connected to the AP 1005, a connection destination of the communication unit 208 is switched from the AP 1005 to the software AP of the communication unit 108 of the audio control device 1001 in accordance with a user operation or an instruction of the management application. When the wireless connection between the communication unit 208 of the mobile terminal 1002 and the communication unit 108 of the audio control device 1001 is established, a screen 509 is displayed. Note that, as a subsequent process, information input to the screen 505 is transmitted through the wireless connection between the communication unit 208 of the mobile terminal 1002 and the communication unit 108 of the audio control device 1001. Thereafter, the mobile terminal 1002 switches the connection destination to the AP 1005 so that the mobile terminal 1002 and the audio control device 1001 are wirelessly connected with each other through the AP 1005. Furthermore, the audio control device 1001 disables the software AP and is wirelessly connected to the AP 1005 through the communication unit 108.

As described above, the audio control device 1001 may execute a first reception process of receiving information (an SSID, a password, and the like) associated with the external AP 1005 from the mobile terminal 1002 through the wireless communication using an access point included in the audio control device 1001. Furthermore, the audio control device 1001 may execute a second reception process of receiving information (an SSID, a password, and the like) associated with the external AP 1005 from the mobile terminal 1002 through the short distance communication. The audio control device 1001 may have one of the reception process functions or both the reception process functions. Furthermore, the audio control device 1001 may be connected to the external AP 1005 by another reception process function.

Next, a process of signing in to the server 1006 performed by the communication apparatus 1004 will be described. For example, the server 1006 which supports the audio control device 1001 and a server 1007 which does not support the audio control device 1001 are included in the Internet. When the audio control device 1001 and the communication apparatus 1004 are to cooperate with each other, the communication apparatus 1004 is required to sign in to the server 1006 instead of the server 1007.

Figure 6A:
FIGS. 6A and 6B are diagrams illustrating examples of screens displayed by the communication apparatus.
Figure 6B:

Therefore, the communication apparatus 1004 has an audio control device cooperation mode. When the audio control device cooperation mode is enabled, the communication apparatus 1004 searches a network including the communication apparatus 1004 for an audio control device. Since the audio control device 1001 is detected, a screen 601 of FIG. 6A is displayed in the display unit 408 of the communication apparatus 1004. When the user presses an OK button in the screen 601, a screen 602 is displayed in the display unit 408 of the communication apparatus 1004. Note that a URL of the server 1006 corresponding to the audio control device 1001 is included in information obtained by the device searching, for example. The communication apparatus 1004 may display the screen 602 used to sign in to the server 1006 by means of the URL. The communication apparatus 1004 may sign in to the server 1006 using the information input in the screen 602. By the process described above, the communication apparatus 1004 may use image data managed by the server 1006.

Furthermore, when the audio control device 1001 corresponding to the server 1007 is detected by the communication apparatus 1004 performing the device searching, the communication apparatus 1004 displays a screen used to sign in to the server 1007.

Note that another process may be performed as the process of signing in to the server 1006 performed by the communication apparatus 1004. An example of the other process will be described. It is assumed first that the mobile terminal 1002 has signed in to the server 1006. For example, the user has signed in to the server 1006 using the screen 506 described above. When the mobile terminal 1002 detects the communication apparatus 1004 through the AP 1005, the mobile terminal 1002 displays identification information of the communication apparatus 1004 and a registration button. For example, the registration button may be displayed adjacent to the communication apparatus in the screen 507. When the user presses the registration button, a registration request is transmitted from the mobile terminal 1002 to the communication apparatus 1004. Note that the registration request includes address information of the server 1006. The communication apparatus 1004 displays a selection screen for determining whether a process of registering a printer is to be performed in the display unit 408 of the communication apparatus 1004 when receiving the registration request. Here, when the user selects execution of the registration process, the communication apparatus 1004 transmits a registration request including a MAC address of the communication apparatus 1004 to the server 1006 in accordance with the address information included in the registration request. The communication apparatus 1004 receives a response to the registration request from the server 1006. Note that the response includes a URL associated with the registration process performed by the communication apparatus 1004. Specifically, the URL is a dedicated URL associated with the registration process of the communication apparatus 1004. The communication apparatus 1004 transmits the response supplied from the server 1006 to the mobile terminal 1002. The mobile terminal 1002 transmits the registration request to the server 1006 using the URL included in the received response. The registration request also includes a user ID and a password which have been input to sign in the server 1006 by the mobile terminal 1002. When the server 1006 which has received the registration request receives an appropriate user ID and an appropriate password, the server 1006 transmits a response indicating that the registration request has been successfully performed to the mobile terminal 1002. Specifically, the server 1006 temporarily registers the communication apparatus 1004 as a print apparatus for the user who has signed in the mobile terminal 1002 at this timing since the server 1006 has received the registration request using the dedicated URL associated with the registration process of the communication apparatus 1004. That is, the server 1006 manages the user ID and the MAC address of the communication apparatus 1004 which are associated with each other. The mobile terminal 1002 transmits completion information indicating that the registration has been completed to the communication apparatus 1004. On receiving the completion information, the communication apparatus 1004 transmits the registration request including the MAC address of the communication apparatus 1004 to the server 1006. The server 1006 determines that the communication apparatus 1004 is in an interim registration state and returns a registration completion response. By the process described above, the server 1006 finally registers the communication apparatus 1004 as a print apparatus for the user who has signed in to the mobile terminal 1002. When receiving the registration completion response from the server 1006, the communication apparatus 1004 transmits information indicating the completion of the registration to the mobile terminal 1002. By the process described above, the communication apparatus 1004 may use image data managed by the server 1006.

Figure 7:
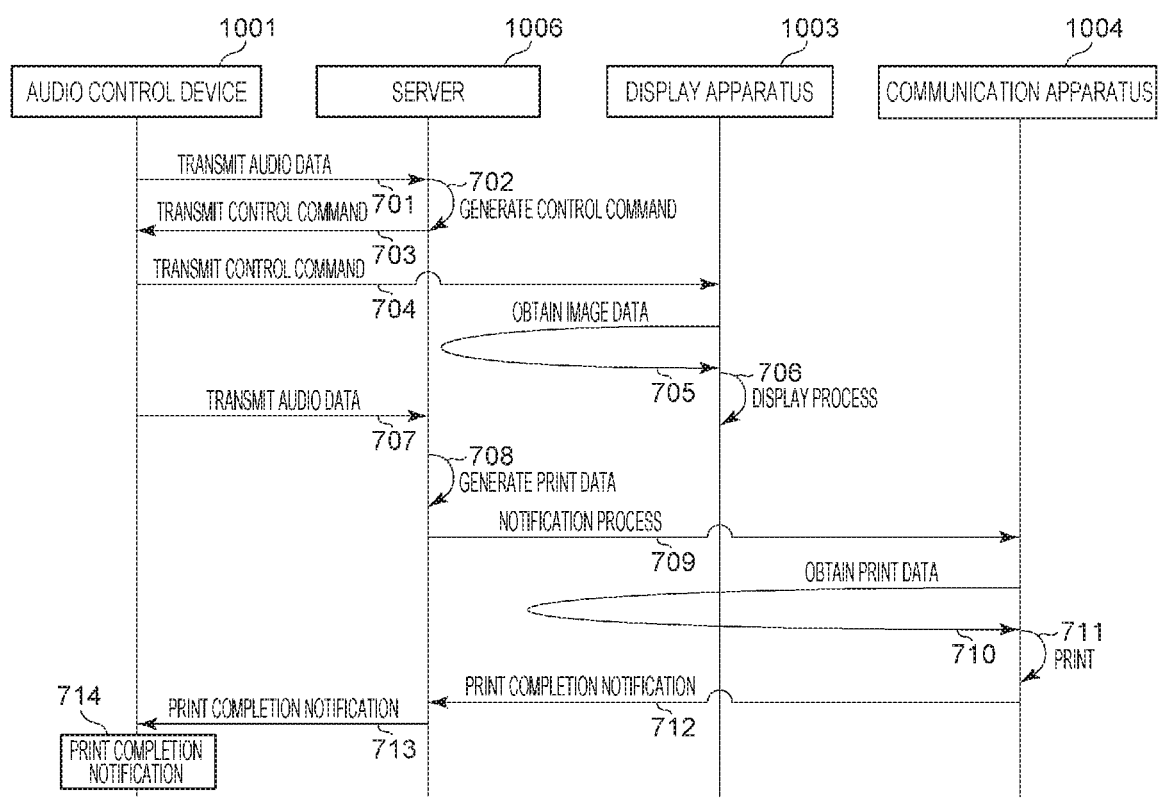
FIG. 7 is a sequence diagram illustrating a print process.

FIG. 7 is a sequence diagram illustrating the print process performed by the communication apparatus 1004 in response to a print instruction issued by voice of the user using the audio control device 1001. It is assumed here that the display apparatus 1003 has signed in to the server 1006. Furthermore, it is assumed that image data corresponding to a photograph A described below is stored in the server 1006 for the user.

The user speaks a wake word which is a keyword determined in advance near the audio control device 1001 before speaking an action to be performed. For example, the user speaks a wake word before speaking "Display the photograph A".

The audio control device 1001 receives the audio said by the user after receiving audio of the wake word. Specifically, the audio control device 1001 receives audio "Display the photograph A".

The audio control device 1001 transmits identification information of the audio control device 1001 (a MAC address, for example) and audio data based on the received audio to the server 1006 (701).

The server 1006 specifies a user ID associated with the MAC address of the audio control device 1001 so as to recognize that the audio control device 1001 has performed sign-in. Furthermore, an access token described above may be used. Then the server 1006 analyzes the audio data transmitted from the audio control device 1001, generates a control command based on the audio data, and transmits the control command to the audio control device 1001 (702 and 703). Note that the control command includes a display process command which is content of a process to be executed and information on a storage location of image data corresponding to the photograph A to be displayed.

The audio control device 1001 selects a target of transmission of the control command received from the server 1006. Here, since the user speaks "Display the photograph A" as a request of the user, the audio control device 1001 selects the display apparatus 1003 as a transmission destination. The audio control device 1001 transmits the control command to the selected display apparatus 1003 (704). Note that, although the audio control device 1001 transmits the control command received from the server 1006 in 704, the audio control device 1001 may transmit another command. Specifically, the audio control device 1001 may generate another command based on the control command received in 703 and transmit the generated other command to the display apparatus 1003. Although the process of transmitting the control command performed by the audio control device 1001 is described in subsequent processes (for example, 704 of FIG. 10), similarly, another command generated based on the control command may be transmitted. In this case, an apparatus which has received the other command may execute a process based on the other command.

The display apparatus 1003 executes a process based on the control command. The display apparatus 1003 accesses the storage location included in the control command so as to obtain image data corresponding to the photograph A stored in the storage location (705). The display apparatus 1003 displays image data A corresponding to the photograph A (706). Note that, if a URL corresponding to the photograph A is included in the control command, the display apparatus 1003 may display the web page including the photograph A by accessing the URL.

Subsequently, the user speaks a wake word first near the audio control device 1001 before speaking an action to be performed. For example, the user speaks "Print the photograph A displayed in the display apparatus 1003" after speaking the wake word.

The audio control device 1001 receives audio of the wake word before receiving words which are subsequently generated. Specifically, the audio control device 1001 receives a print instruction by audio when receiving the audio "Print the photograph A displayed in the display apparatus 1003".

The audio control device 1001 transmits audio data to the server 1006 (707). Note that a basic process is the same as that in 701.

The server 1006 analyzes the audio data transmitted from the audio control device 1001 and executes a process based on the audio data. Since the server 1006 has received the audio data of the audio "Print the photograph A displayed in the display apparatus 1003", the server 1006 generates print data based on the image data corresponding to the photograph A (708). Note that a server which is different from the server 1006 may generate print data in the process 708. For example, a manufacturer of the communication apparatus 1004 provides a print server including software for generating print data. The server 1006 may request the print server to generate print data and the print server may generate print data.

When the generation of the print data is completed, the server 1006 transmits a notification indicating that the generation of the print data has been completed to the communication apparatus 1004 (709).

When receiving the notification indicating that the generation of the print data has been completed, the communication apparatus 1004 accesses the server 1006 so as to obtain the print data and execute printing (710 and 711).

The communication apparatus 1004 transmits a print completion notification to the server 1006 (712) after the print process is completed, and the server 1006 transmits the print completion notification to the audio control device 1001 (713).

The audio control device 1001 transmits a notification indicating the completion of the printing by audio when receiving the print completion notification (714).

Note that, if the audio control device 1001 may identify a name of the user who has requested the printing from the voice "Print the photograph A displayed in the display apparatus 1003", audio data may be generated after adding the user name. By this process, the communication apparatus 1004 may display the user name during operation of the print process 711 or as a print history.

Furthermore, the user speaks a wake word first near the audio control device 1001, and thereafter, speaks an action to be performed after the print completion notification is transmitted and before print using another print data is instructed. For example, the user additionally speaks an instruction indicating the number of copies such as an instruction "another copy" or "three additional copies" after the wake word.

The audio control device 1001 which has received an instruction for adding copies may transmit the audio data transmitted in the process 707 again. Note that audio data corresponding to "another copy" and "three additional copies" is also transmitted. The server 1006 performs a print data generation process the same as that in the process 708 by receiving the two audio data. Then the server 1006 sets the number of copies based on audio data of a new request. By this process, the user may easily instruct re-print using the same image data. Furthermore, the user speaks a wake word first near the audio control device 1001, and thereafter, speaks an action to be performed after the print completion notification is transmitted and before print using another print data is instructed. For example, the user speaks "Print the photograph A in a larger sheet" after speaking the wake word.

The audio control device 1001 which has received the instruction may transmit the audio data transmitted in the process 707 again. Note that audio data corresponding to "Print the photograph A in a larger sheet" may also be transmitted. The server 1006 performs a print data generation process the same as that in the process 708 by receiving the two audio data. Then the server 1006 sets a sheet size based on the audio data of the new request. By this process, the user may easily instruct printing of the same image data in a sheet of a different size. Note that another apparatus which generates print data may perform the same process when the other apparatus generates print data as described below.

Figure 8:
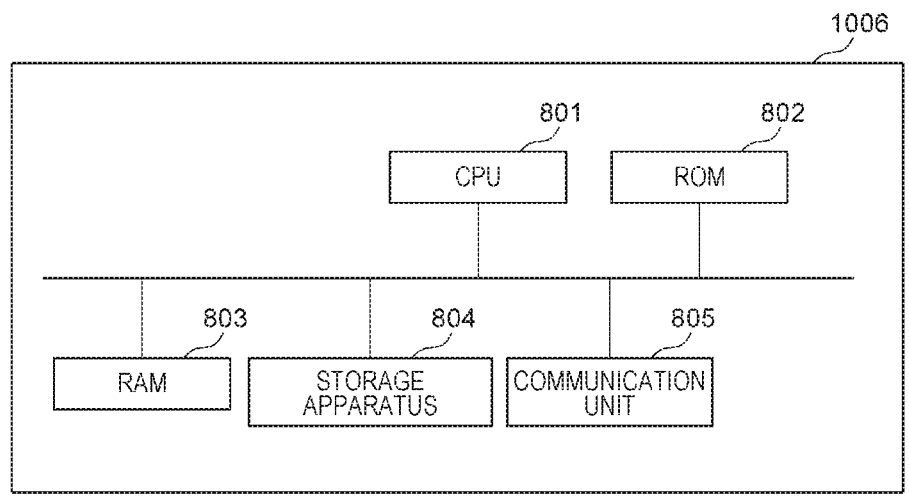
FIG. 8 is a diagram illustrating an example of a hardware configuration of a server.

FIG. 8 is a diagram illustrating a hardware configuration of the server 1006. The server 1006 includes a CPU 801, a ROM 802, a RAM 803, a storage apparatus 804, and a communication unit 805. The CPU 801 is a system controller which controls the entire server 1006. Note that, although only one server 1006 is described in this embodiment, a plurality of information processing apparatuses may operate in cooperation with each other so as to configure a server system corresponding to the server 1006. The ROM 802 stores fixed data such as control programs to be executed by the CPU 801, data tables, and embedded OS programs. Data is stored using a primary battery for data backup, not illustrated, and therefore, the RAM 106 may store the data, such as program control variables, in a non-volatile state. The storage apparatus 804 stores application software. Note that the server 1006 generates print data as described above in FIG. 7. Therefore, the storage apparatus 804 of the server 1006 stores print software for generating print data which may be interpreted by the communication apparatus 1004. The communication unit 805 includes a circuit and an antenna for performing communication based on a predetermined wireless communication method.

Figure 9:
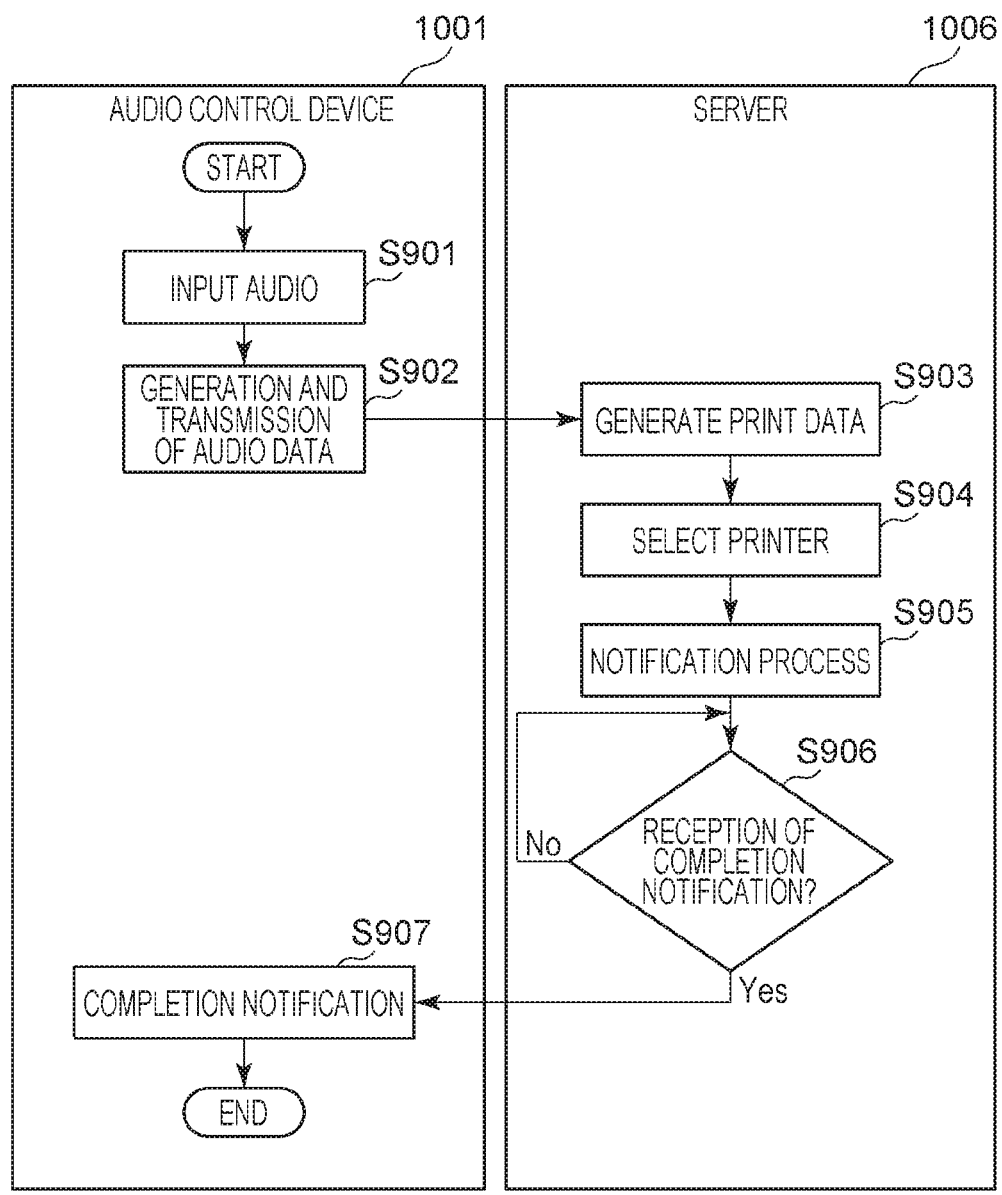
FIG. 9 is a flowchart of an example of a process performed by the audio control device and the server.

Next, processes performed by the audio control device 1001 and the server 1006 will be described with reference to FIG. 9. FIG. 9 is a flowchart corresponding to the process 707 to the process 714 of FIG. 7. Note that the process of the audio control device 1001 is executed when the CPU 103 reads and executes a program associated with the process of the flowchart from a memory. Note that the process of the server 1006 is executed when the CPU 801 reads and executes a program associated with the process of the flowchart from a memory.

The CPU 103 inputs words (audio) generated by the user near the audio control device 1001 (S901) and generates audio data based on the input audio. Then the audio data is transmitted from the audio control device 1001 to the server 1006 (S902).

When receiving the audio data, the CPU 801 analyzes the audio data and specifies a request of the user. The server 1006 receives audio data corresponding to a user request "Print the photograph A displayed in the display apparatus 1003". Therefore, the CPU 801 specifies image data corresponding to the photograph A displayed in the display apparatus 1003, generates print data based on the image data (S903), and selects a printer to execute a print process (S904). Note that print setting information used when the print data is generated in step S903 is set in advance for printing using the server 1006. The CPU 801 specifies a user ID associated with a MAC address of the audio control device 1001. Then the server 1006 specifies the communication apparatus 1004 managed in association with the user ID. The process in step S904 is realized by the process described above.

The CPU 801 transmits a notification indicating that the generation of the print data for the printer (the communication apparatus 1004) selected in step S904 has been completed to the communication apparatus 1004 (S905). Thereafter, the CPU 801 determines whether the print completion notification has been supplied from the communication apparatus 1004 (S906).

When the print completion notification has been received from the communication apparatus 1004 in step S906, the CPU 801 transmits the print completion notification to the audio control device 1001 which is a print instruction source (S907).

The CPU 103 transmits a notification indicating the completion of the printing by audio when receiving the print completion notification. Specifically, the CPU 103 converts the print completion notification into audio and outputs the print completion by audio through the speaker 102.

By the process described above, the user may print a desired photograph by a simple operation.

Figure 10:
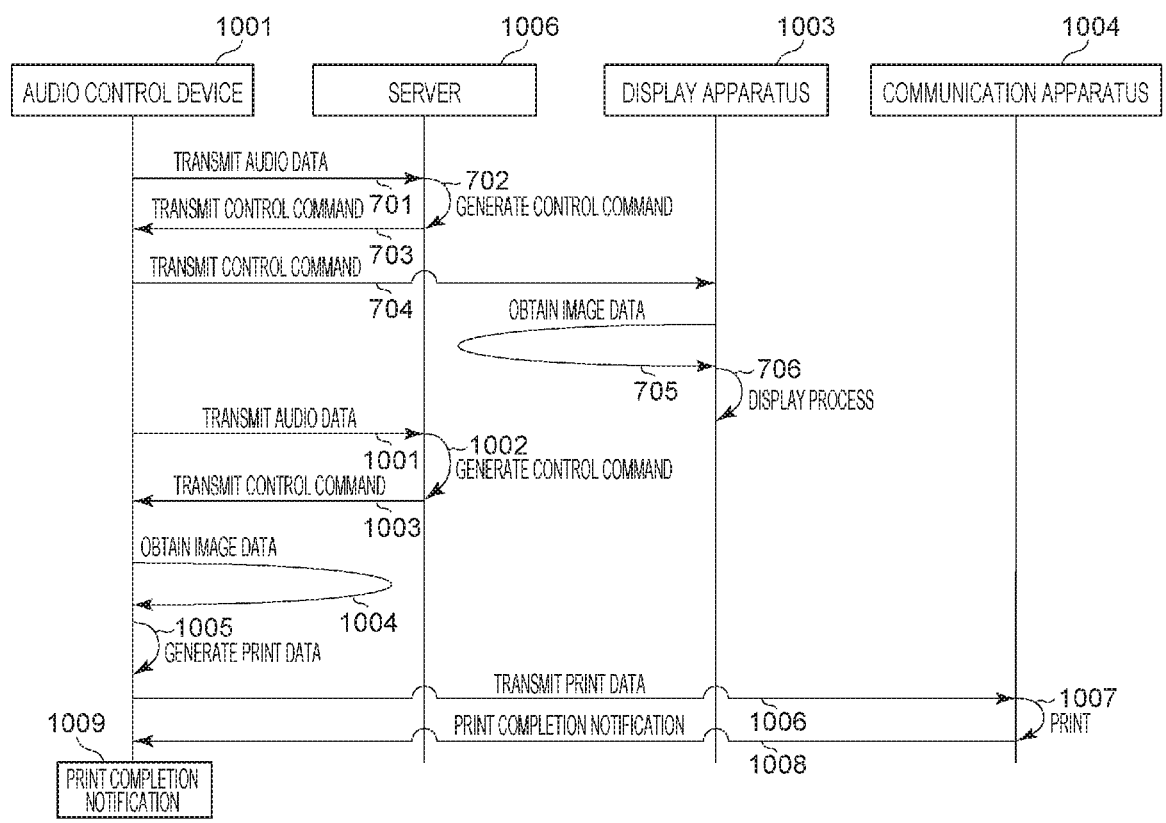
FIG. 10 is a sequence diagram illustrating the print process.

In FIGS. 7 and 8, the case where the communication apparatus 1004 performs printing using a notification indicating that generation of print data supplied from the server 1006 has been completed is described as an example. In FIG. 10, a case where the audio control device 1001 generates print data will be described as another example.

FIG. 10 is a sequence diagram illustrating the print process. Note that the process 701 to the process 706 are described with reference to FIG. 7, and therefore, detailed descriptions thereof are omitted. Furthermore, the audio control device 1001 generates print data in FIGS. 10 and 11. Therefore, the external storage apparatus 107 of the audio control device 1001 stores print software for generating print data which may be interpreted by the communication apparatus 1004, information required for communication, and the like.

The audio control device 1001 receives audio of a wake word before receiving words which are subsequently generated. Specifically, the audio control device 1001 receives audio "Print the photograph A displayed in the display apparatus 1003".

The audio control device 1001 transmits the audio data to the server 1006 (1001).

The server 1006 analyzes the audio data transmitted from the audio control device 1001 and executes a process based on the audio data. The server 1006 receives audio data corresponding to the audio "Print the photograph A displayed in the display apparatus 1003". Therefore, the server 1006 generates a control command for printing image data corresponding to the photograph A (1002).

The server 1006 transmits the control command generated in the process 1002 to the audio control device 1001 (1003).

The audio control device 1001 executes a process based on the control command. An instruction for obtaining and printing image data corresponding to the photograph A is included in the control command, and therefore, the audio control device 1001 obtains image data corresponding to the photograph A from the server 1006 (1004).

The audio control device 1001 generates print data based on the obtained image data and print setting information (1005). The print setting information used in the process 1005 is set in print software stored in the audio control device 1001 in advance.

The audio control device 1001 transmits the print data generated in the process 1005 to the communication apparatus 1004 (1006).

When the print process based on the print data is completed (1007), the communication apparatus 1004 transmits a print completion notification to the audio control device 1001 (1008).

The audio control device 1001 transmits a notification indicating the completion of the printing by audio when receiving the print completion notification (1009). In other words, the audio control device comprises notification means configured to generate a notification indicating print completion on receipt of the print completion notification. Such notification generated by the audio control device is an audio notification in this embodiment.

Figure 11:
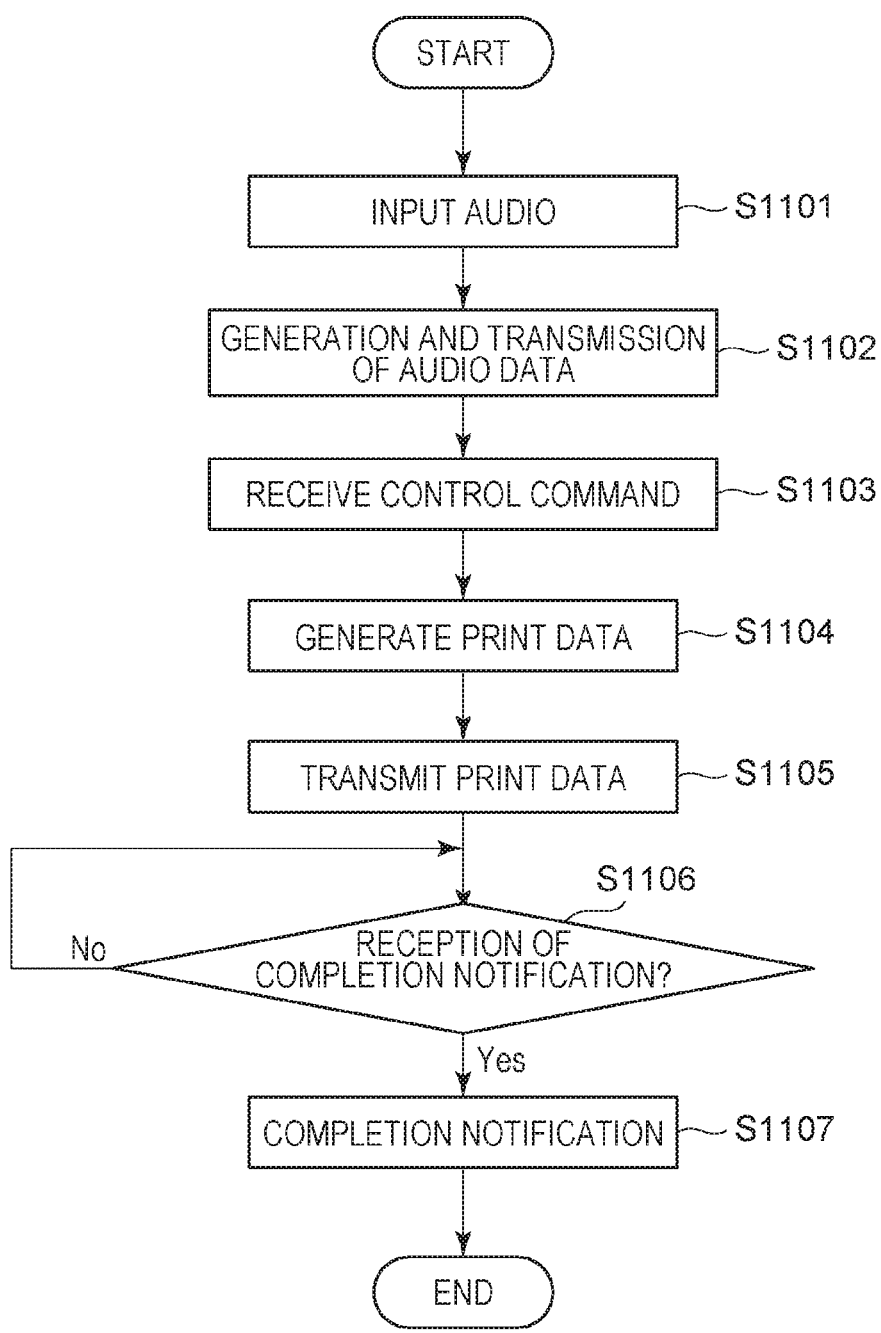
FIG. 11 is a flowchart of an example of a process performed by the audio control device.

Next, the process of the audio control device 1001 will be described with reference to FIG. 11. FIG. 11 is a flowchart corresponding to the process 1001 to the process 1009 of FIG. 10.

Note that a process in step S1101 and step S1102 of FIG. 11 is the same as the process in step S901 and step S902 of FIG. 9, and therefore, a detailed description thereof is omitted.

The CPU 103 receives a control command from the server 1006 (S1103). The CPU 103 analyzes the received control command and specifies a process to be executed next. The control command includes an instruction for obtaining image data of the photograph A and an instruction for printing the image data. Therefore, the CPU 103 obtains the image data from the server 1006 and generates print data (S1104). Note that the print data is generated in step S1104 using the print setting information set in advance as described above.

The CPU 103 transmits the print data to the communication apparatus 1004 (S1105). Here, the display apparatus 1003 and the communication apparatus 1004 have been registered in the CPU 103 as apparatuses to be controlled by the audio control device 1001 in accordance with an instruction issued through the screen 507 of FIG. 5F described above. Therefore, the CPU 103 determines the communication apparatus 1004 as a transmission destination of the print data in accordance with the registration.

The CPU 103 determines whether the print completion notification has been received (S1106). When the determination is affirmative, the CPU 103 transmits a notification indicating that the printing has been completed by audio (S1107).

By the process described above, the user may print a desired photograph by a simple operation. Furthermore, a load of the server 1006 may be reduced.

Subsequently, a case where the display apparatus 1003 generates print data will be described as an example.

Figure 12:
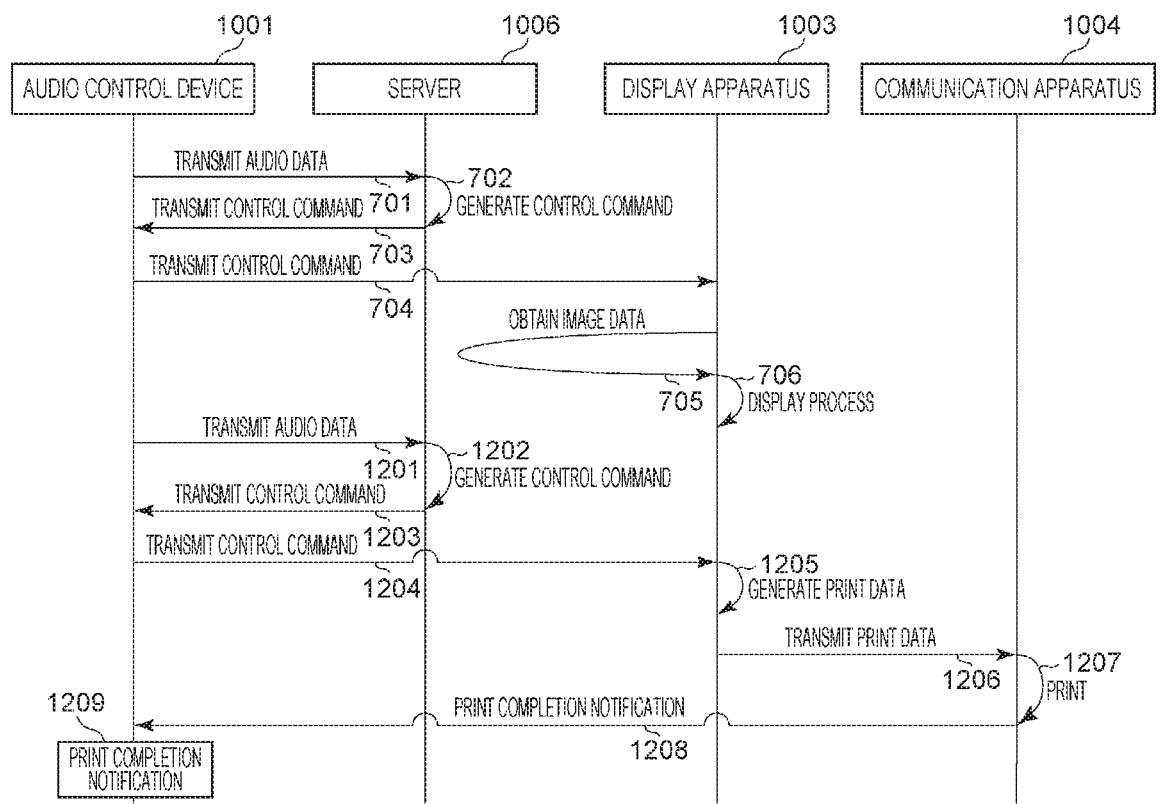
FIG. 12 is a sequence diagram illustrating the print process.

FIG. 12 is a sequence diagram illustrating the print process. Note that the processes 701 to 706 are described with reference to FIG. 7, and therefore, detailed descriptions thereof are omitted. Furthermore, processes 1201 to 1203 are the same as the processes 1001 to 1003 of FIG. 10 and processes 1207 to 1209 are the same as the processes 1007 to 1009 of FIG. 10, and therefore, detailed descriptions thereof are omitted. In the process in FIG. 12, the display apparatus generates print data. Therefore, the external storage apparatus 207 of the display apparatus 1003 stores print software for generating print data which may be interpreted by the communication apparatus 1004, information required for communication, and the like.

The audio control device 1001 executes a process based on a control command. An instruction for obtaining image data corresponding to the photograph A and printing the image data is included in the control command. In FIG. 12, the display apparatus 1003 generates print data. Therefore, the audio control device 1001 transmits the control command to the display apparatus 1003 (1204).

The display apparatus 1003 executes a process based on the received control command. The display apparatus 1003 has obtained the image data for display, and therefore, generates print data based on the obtained image data (1205). The print setting information used in the process 1205 is set in the print software stored in the display apparatus 1003 in advance. In this case, the display apparatus 1003 may display the print setting information in a display unit.

The display apparatus 1003 transmits the print data generated in the process 1205 to the communication apparatus 1004 (1206).

By the process described above, the user may print a desired photograph by a simple operation. Furthermore, loads of the server 1006 and the audio control device 1001 may be reduced.

Subsequently, a setup process of executing a print process in accordance with a print instruction issued by audio input to the audio control device 1001 performed by the communication apparatus 1004 will be described.

First, various types of audio control device will be described as examples.

When printing is performed using the audio control device 1001 of an A company, for example, a server A corresponding to the audio control device 1001 generates print data. Furthermore, the communication apparatus 1004 may display a screen for setting a user ID and a password which are used for access to the server A.

When printing is performed using the audio control device 1001 of a B company, for example, a server B corresponding to the audio control device 1001 generates print data. Furthermore, the communication apparatus 1004 prints an invitation page for access to the server B.

When printing is performed using the audio control device 1001 of a C company, for example, a server C corresponding to the audio control device 1001 generates print data. Furthermore, it is assumed that the mobile terminal 1002 accepts an operation for access by the communication apparatus 1004 to the server C.

When printing is performed using the audio control device 1001 of a D company, for example, the audio control device 1001 generates print data. Specifically, server cooperation is not required.

When printing is performed using the audio control device 1001 of an E company, for example, a server E corresponding to the audio control device 1001 generates print data. Furthermore, the communication apparatus 1004 may display a screen for setting a user ID and a password which are used for access to the server E. Note that the communication apparatus 1004 stores a table in FIG. 15 including the features described above. Note that different wake words are used by different manufacturers of the audio control device 1001.

Figure 13:
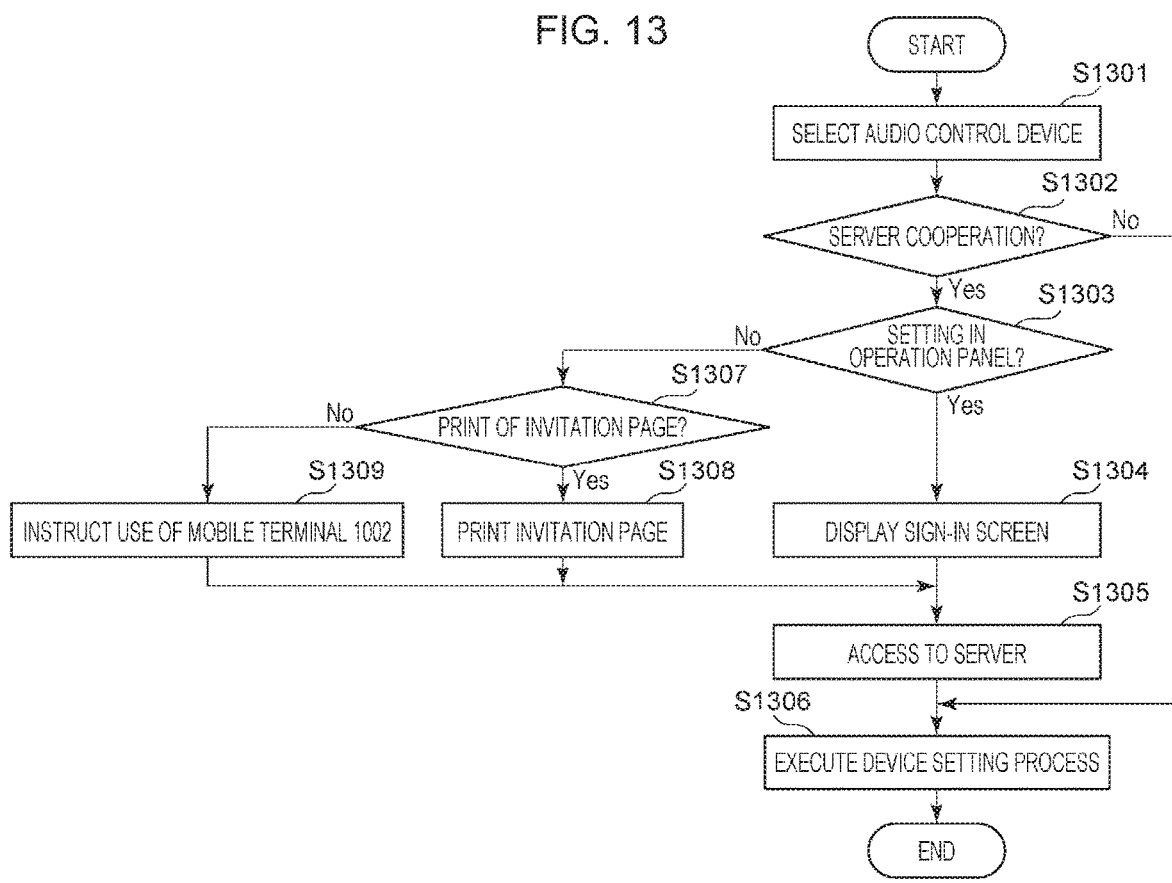
FIG. 13 is a flowchart of an example of a process performed by the communication apparatus.
Figure 14A:
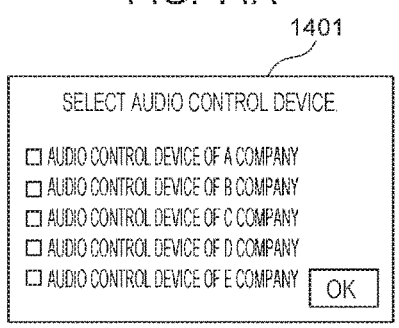
FIGS. 14A to 14E are diagrams illustrating examples of screens displayed by the communication apparatus.
Figure 14B:
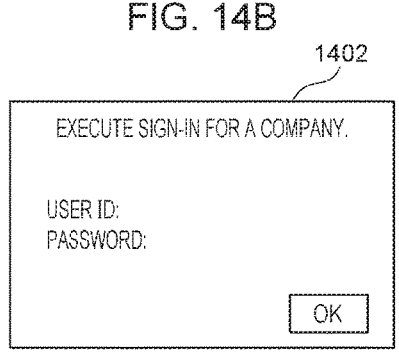
Figure 14C:
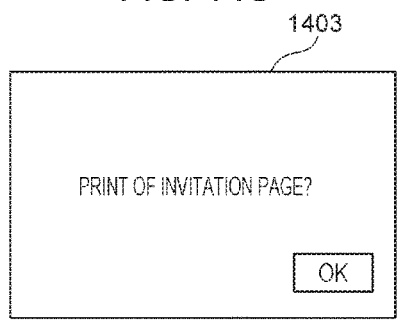
Figure 14D:
Figure 14E:
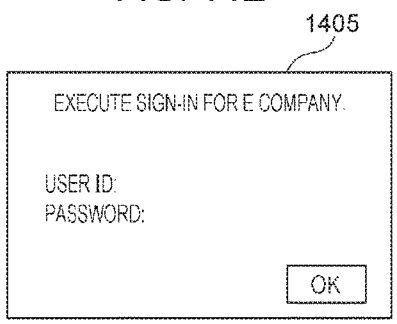

Next, the process performed by the communication apparatus 1004 will be described with reference to FIG. 13.

First, when the user instructs cooperation between the audio control device 1001 and the communication apparatus 1004, the CPU 407 displays a selection screen 1401 of the audio control device 1001 which is a target of the cooperation (S1301). Note that examples of screens associated with setup of the communication apparatus 1004 are illustrated in FIGS. 14A to 14E.

The CPU 407 determines whether the server cooperation is required based on the audio control device 1001 selected in the selection screen 1401 (S1302). For example, the communication apparatus 1004 performs the determination in step S1302 using the table illustrated in FIG. 15. Specifically, when the audio control devices 1001 of the A to C companies are selected, the CPU 407 determines that the determination in step S1302 is affirmative. On the other hand, when the audio control device 1001 of the D company is selected, the CPU 407 determines that the determination in step S1302 is negative.

When the determination is negative in step S1302, the process of the CPU 407 proceeds to step S1306 described below.

When the determination is affirmative in step S1302, the CPU 407 determines sign-in is to be executed using the operation panel of the communication apparatus 1004 (S1303). When the audio control device 1001 of the A company or the E company is selected, the CPU 407 determines that the determination is affirmative in step S1303. On the other hand, when the audio control devices 1001 of the B and C companies are selected, the CPU 407 determines that the determination is negative in step S1303.

When the determination is affirmative in step S1303, the CPU 407 displays a sign-in screen on the operation panel (S1304) and accesses the server 1006 or 1007 using a user ID and a password input through a sign-in screen (S1305). When the audio control device 1001 of the A company is selected, a sign-in screen 1402 is displayed in step S1304. On the other hand, when the audio control device 1001 of the E company is selected, a sign-in screen 1405 is displayed in step S1304.

On the other hand, when the determination is negative in step S1303, the CPU 407 determines whether the invitation page is to be printed (S1307). When the audio control device 1001 of the B company is selected, the CPU 407 determines that the determination is affirmative in step S1307. On the other hand, when the audio control devices 1001 of the C company is selected, the CPU 407 determines that the determination is negative in step S1307.

When the determination is affirmative in step S1307, the CPU 407 displays a screen 1403 indicating that the invitation page is to be printed. When an OK button of the screen 1403 is pressed, the CPU 407 prints the invitation page (S1308). When transmitting a request for printing the invitation page and the MAC address of the communication apparatus 1004 to the server B, the CPU 407 receives print data of the invitation page from the server B. The CPU 407 executes a print process based on the received print data. Note that the printed invitation page includes a dedicated URL associated with the registration process of the communication apparatus 1004 printed thereon. Therefore, a sign-in screen for the communication apparatus 1004 is displayed in the mobile terminal 1002 when the user inputs a URL of the invitation page in the mobile terminal 1002 or the like. The user inputs a user ID and a password in the sign-in screen for the communication apparatus 1004 displayed in the mobile terminal 1002 and transmits the user ID and the password to the server B. The server B executes the sign-in process based on the user ID and the password received in the sign-in screen for the communication apparatus 1004. When this process has been successfully performed, the server B manages the user ID received in the sign-in screen of the communication apparatus 1004 and the MAC address of the communication apparatus 1004 which are associated with each other. Then the server B transmits a notification indicating that the sign-in to the communication apparatus 1004 has been successfully performed and transmits the user ID and the password to the communication apparatus 1004. By the process described above, the CPU 407 accesses the server B in step S1305 after the process in step S1308 (S1305).

When the determination is negative in step S1307, the CPU 407 displays a message 1404 indicating execution of association using the mobile terminal 1002 (S1309). Specifically, when the audio control device 1001 of the C company is selected, the process in step S1309 is executed. Note that the process in step S1309 corresponds to another process of signing in the server 1006 performed by the communication apparatus 1004 described above, and therefore, a detailed description thereof is omitted. By the process described above, the CPU 407 accesses the server C in step S1305 (S1305) after the process in step S1309, and thereafter, the CPU 407 executes a setting process for cooperation with the audio control device 1001 after step S1305 (S1306). For example, the communication apparatus 1004 operates in a power-saving state if the communication apparatus 1004 does not receive print data for a predetermined period of time. When the communication apparatus 1004 receives print data while operating in the power-saving state, the communication apparatus 1004 is in a first power saving mode in which a printing process is executed based on the print data or a second power saving mode in which print data is not processed even when the print data is received. Note that power consumption in the second power saving mode is smaller than that in the first power saving mode. Here, the CPU 407 sets the first power saving mode as a setting process for cooperation with the audio control device 1001. Note that, in the first power saving mode, the print process may be executed only when the audio control device 1001 has received print data based on a print instruction by received audio.

Note that, although the case where the user selects the audio control device 1001 is described as an example of the process in step S1301, another method may be employed. For example, when the communication apparatus 1004 obtains device information from the audio control device 1001 detected by executing the device searching. The CPU 407 may automatically select the audio control device 1001 which is a cooperation target based on the device information obtained from the audio control device 1001. In this case, the process in step S1301 is omitted.

By the process described above, even when the print data is transmitted in various routes, the communication apparatus 1004 may appropriately execute the print process. Note that, if a plurality of same audio control devices 1001 are included in a network when the process in FIG. 13 is executed, the communication apparatus 1004 signs in the same server so as to cooperate with the audio control device 1001. For example, when a plurality of audio control devices 1001 of the A company are included in a network, the user signs in once so as to cooperate with the server A using the communication apparatus 1004. On the other hand, if a plurality of different audio control devices 1001 are included in a network, the communication apparatus 1004 signs in to different servers so as to cooperate with the audio control device 1001. For example, when the audio control device 1001 of the A company and the audio control device 1001 of the E company are included in a network, the user performs sign-in using the communication apparatus 1004 so as to cooperate with the server A and further performs sign-in so as to cooperate with the server E.

Figures 15, 16:
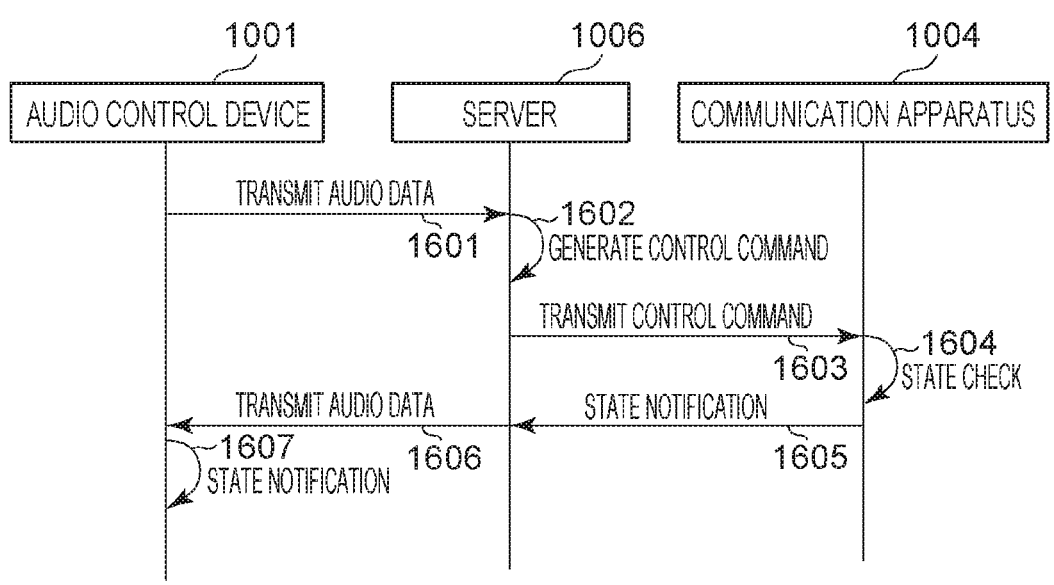
FIG. 15 is a diagram illustrating an example of a table stored in the communication apparatus.
FIG. 16 is a sequence diagram illustrating a process which is different from printing.

Next, a process performed when the user requests a process other than the printing by voice will be described with reference to FIG. 16. For example, the user speaks "Tell me an amount of remaining ink" after speaking the wake word.

The audio control device 1001 receives audio of the wake word before receiving the audio which is subsequently generated. Specifically, the audio control device 1001 receives the audio "Tell me an amount of remaining ink".

The audio control device 1001 transmits identification information of the audio control device 1001 (a MAC address, for example) and audio data based on the received audio to the server 1006 (1601).

The server 1006 analyzes the audio data transmitted from the audio control device 1001, generates a control command based on the audio data, and transmits the control command to the communication apparatus 1004 (1602 and 1603). The control command includes an instruction for checking an amount of remaining ink.

The communication apparatus 1004 executes a process based on the control command. The communication apparatus 1004 checks the amount of remaining ink and transmits a result of the check to the server 1006 (1604 and 1605). The server 1006 generates audio data based on the checking result. For example, when receiving the checking result indicating that cyan has run out, the server 1006 generates audio data indicating that the cyan has run out.

The audio control device 1001 generates a notification as audio indicating the checking result based on the received audio data (1607). Note that inquiries of a state of the communication apparatus 1004, the number of remaining sheets, and the like may be received in addition to the amount of remaining ink.

Furthermore, when the user has received an audio notification indicating that the cyan ink has run out, the cyan ink may be further ordered by voice. In this case, the audio control device 1001 receives a serial number for specifying a product type of the communication apparatus 1004. Then the audio control device 1001 transmits audio data indicating the order of the cyan ink and the serial number to the server 1006. Then the server 1006 may generate order data based on the audio data and the serial number and make an order.

Furthermore, when a user operation is required due to an error or the like, the communication apparatus 1004 displays an operation method in the operation panel of the communication apparatus 1004. In this case, as for a user operation performed using both hands, audio data indicating an operation method is generated and the audio data is transmitted to the audio control device 1001. Then the audio control device 1001 issues an audio notification indicating the operation method. By this, even the operation using both hands of the user may be easily performed. For example, the communication apparatus 1004 may display an ink exchange method in the operation panel, and may issue a notification if a sheet jam or the like has occurred during printing or if ink wiping cleaning is required.

By the process described above, the user may easily request an instruction other than a print instruction.

Figure 17:
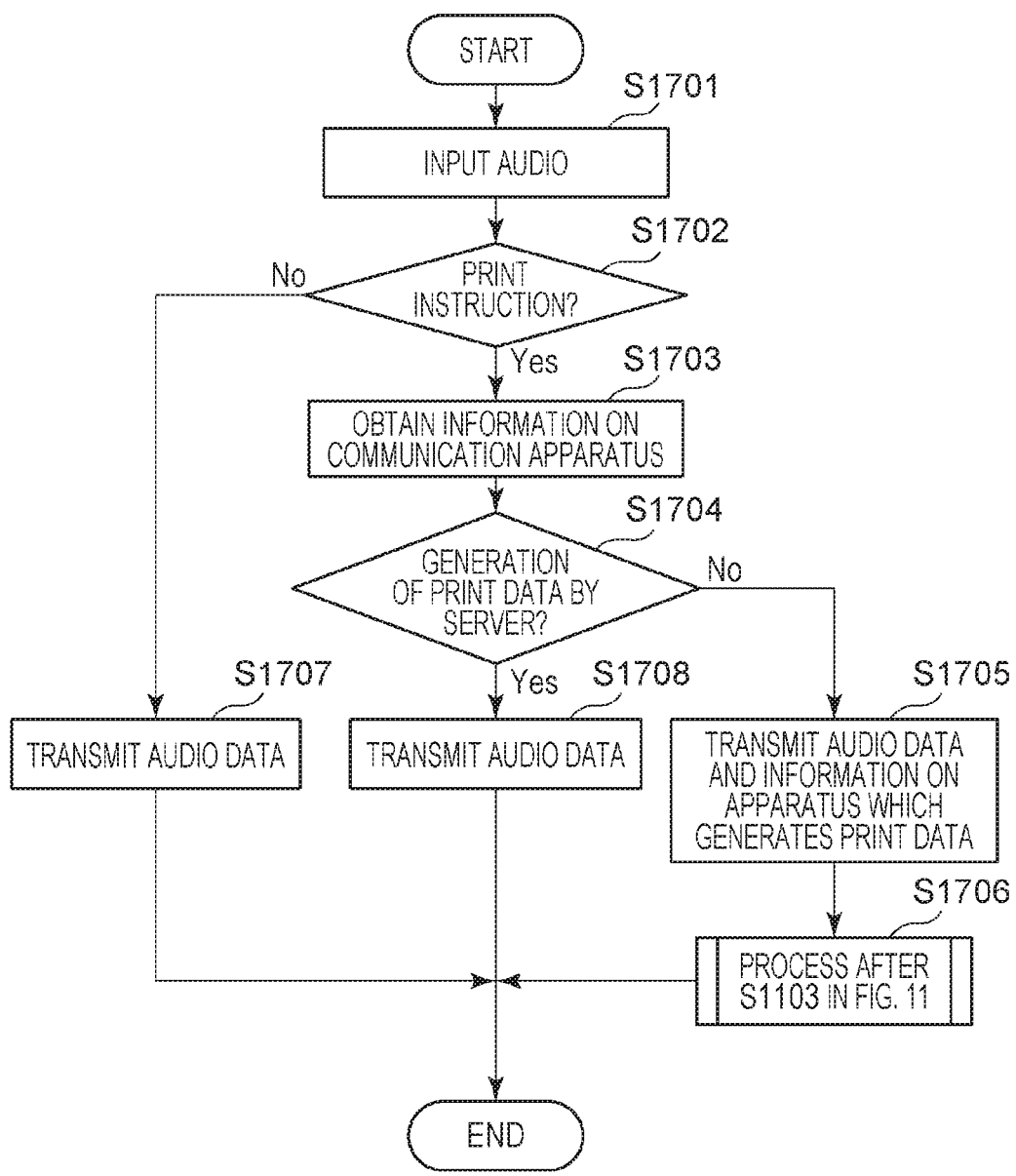
FIG. 17 is a flowchart of an example of a process performed by the audio control device.

Next, a process of determining whether print data is to be generated by the audio control device 1001 or generation of print data is requested to the server 1006 which is performed by the audio control device 1001 will be described. FIG. 17 is a flowchart illustrating a process performed by the audio control device 1001.

The CPU 103 receives a word (audio) spoken by the user in the vicinity of the audio control device 1001 after a wake word (S1701).

The CPU 103 determines whether the audio includes a print instruction (S1702). When the determination is negative in step S1702, the CPU 103 generates audio data based on the input audio and transmits the audio data to the server 1006 (S1707).

On the other hand, when the determination is affirmative in step S1702, the CPU 103 obtains information on the communication apparatus 1004 (S1703). When the communication apparatus 1004 has performed the sign-in process on the server 1006, the communication apparatus 1004 stores information indicating that the communication apparatus 1004 is in cooperation with the server 1006. Therefore, in step S1703, information indicating the cooperation with the server 1006 or information indicating that the process of signing in to the server 1006 has been completed is obtained.

The CPU 103 determines whether the server 1006 generates print data based on the information obtained in step S1703 (S1704). Specifically, when the information indicating cooperation with the server 1006 or the information indicating that the process of signing in to the server 1006 has been completed is obtained, the CPU 103 determines that the server 1006 generates print data. On the other hand, when the information is not obtained in step S1703, the CPU 103 determines that the server 1006 does not generate print data.

When the determination is negative in step S1704, the CPU 103 generates audio data based on the input audio. The CPU 103 further generates information for specifying the "Audio control device 1001" as an apparatus which generates print data. Then the CPU 103 transmits the audio data and the information specifying the apparatus which generates print data to the server 1006 (S1705).

The CPU 103 executes a process from step S1103 to step S1107 in FIG. 11 in step S1705 (S1706). As a result, a process after the process 1003 in FIG. 10 is executed.

On the other hand, when the determination is affirmative in step S1704, the CPU 103 generates audio data based on the input audio and transmits the audio data to the server 1006 (S1708). After step S1708, a process after the process 708 in FIG. 7 is executed. Note that information for specifying the "server 1006" may be transmitted as an apparatus which generates print data in addition to the audio data.

By the process described above, the audio control device 1001 causes the server 1006 to generate print data when the communication apparatus 1004 may obtain print data from the server 1006. On the other hand, when the communication apparatus 1004 may not obtain print data from the server 1006, the audio control device 1001 generates print data. By the process described above, the audio control device 1001 may execute an efficient process. Specifically, the audio control device 1001 may request the server 1006 to generate print data when the communication apparatus 1004 may obtain print data from the server 1006, and therefore, a load of generation of print data is reduced.

Note that, although a process after step S1702 is executed when the user inputs audio in step S1701 in FIG. 17, the process may be executed at another timing. For example, the audio control device 1001 may execute the process in step S1703 and step S1704 before the process in step S1701 so as to determine an apparatus to generate print data in advance.

Furthermore, other information may be obtained in step S1704. The communication apparatus 1004 may determine whether the sign-in to the server 1006 has been performed, for example, and therefore, the communication apparatus 1004 may specify the audio control device 1001 or the server 1006 as the apparatus to generate print data. Alternatively, information indicating whether the server cooperation is enabled may be obtained in step S1703. When the server cooperation is enabled, a determination may be affirmative in step S1703, and otherwise, the determination may be negative in step S1703.

Second Embodiment

In a second embodiment, a case where the communication apparatus 1004 has the function of the audio control device 1001 will be described. Note that descriptions of functions the same as those in the first embodiment are omitted.

Figure 18:
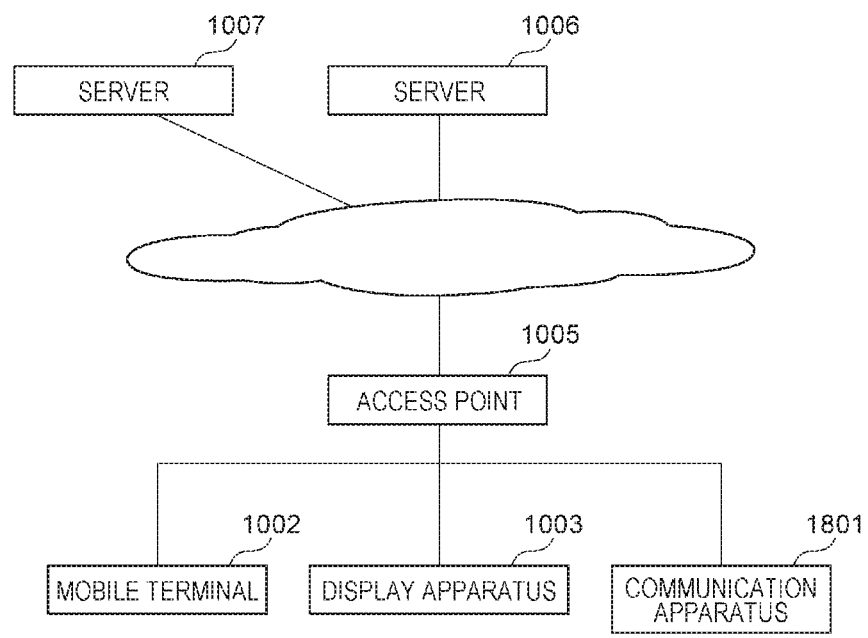
FIG. 18 is a diagram illustrating an example of a system configuration.

FIG. 18 is a diagram illustrating a system configuration according to this embodiment. FIG. 18 is different from FIG. 1 in that the audio control device 1001 is not included. Furthermore, a communication apparatus 1801 has the function of the audio control device 1001 in addition to the function of the communication apparatus 1004.

Figure 19:
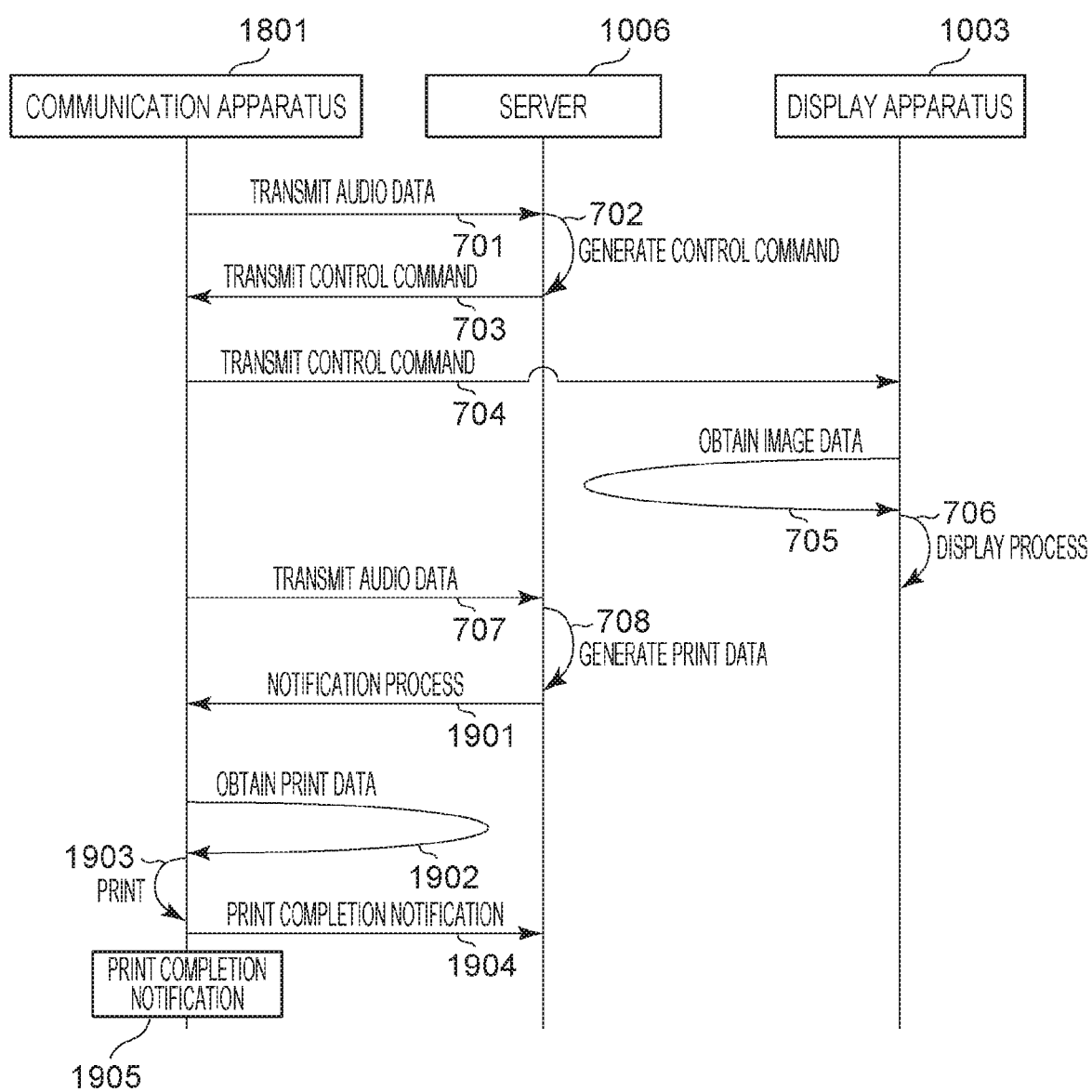
FIG. 19 is a sequence diagram of a print process.

FIG. 19 is a sequence diagram illustrating a flow of a process until printing is performed according to this embodiment. FIG. 19 is a sequence diagram illustrating a process of executing a print process performed by the communication apparatus 1801 in response to a print instruction issued by voice of the user. It is assumed here that a display apparatus 1003 has signed in to a server 1006. Furthermore, an instruction issued by the user by voice is the same as that described with reference to FIG. 7. Specifically, before a process 701, the user speaks a wake word followed by words "Display the photograph A", and before a process 707, the user speaks the wake word followed by words "Print the photograph A displayed in the display apparatus 1003". Furthermore, the process 701 to a process 708 are the same as those in FIG. 7 except for the audio control device 1001 is replaced by the communication apparatus 1801.

When the generation of print data is completed, the server 1006 transmits a notification indicating that the generation of print data has been completed to the communication apparatus 1801 (1901).

When receiving the notification indicating that the generation of print data has been completed, the communication apparatus 1801 accesses the server 1006 so as to obtain the print data and execute printing (1903).

The communication apparatus 1801 transmits a print completion notification to the server 1006 when the print process is completed (1904). By this, the server 1006 changes a status of the print data generated in the process 708 from "being printed" to "completed".

The communication apparatus 1801 issues a notification indicating the print completion by audio (1905).

According to this embodiment, the communication apparatus 1801 has the function of the audio control device 1001, and therefore, the more convenient print process may be realized with a system configuration simpler than other embodiments.

Other Embodiments

In the foregoing embodiments, the case where a photograph displayed in the display apparatus 1003 is printed is described. However, the printing may be instructed by another method.

For example, the user speaks "Print the file A" after speaking a wake word. An audio control device 1001 or a communication apparatus 1801 transmits audio data corresponding to the audio "Print the file A" to the server 1006. Then the server 1006 may search data managed for the user for data having a name "file A" and generate print data.

Furthermore, in the foregoing embodiments, the case where image data corresponding to a photograph is printed is described. However, data to be printed is not limited to image data but may be document data.

Furthermore, in the foregoing embodiments, a mode in which the communication apparatus 1004 (or the communication apparatus 1801) performs printing in accordance with a print instruction issued by the user by voice is described. However, the communication apparatus 1004 (or the communication apparatus 1801) may execute the print process based on print data generated by an instruction issued by a certain method other than a method using audio to print software (a printer driver, for example) installed in a personal computer. The instruction issued by a certain method other than audio indicates an instruction issued by an operation using a mouse or an operation using a touch panel.

Furthermore, although Bluetooth is used as an example of the short distance communication in the foregoing embodiment, other communication methods may be employed. For example, WiFiAware may be used instead of Bluetooth. The foregoing embodiments may be realized by executing the following process. Specifically, software (programs) which realizes the functions of the foregoing embodiments is supplied to a system or an apparatus through a network or various storage media. Then a computer (a CPU, an MPU, a processor, or the like) of the system or the apparatus reads and executes the programs. The programs may be executed by a single computer or a plurality of computers in cooperation. Furthermore, all the processes described above may not be realized by software, and some or all the processes may be realized by hardware, such as application specific integrated circuit(s) (ASIC). Furthermore, it is not necessarily the case that only a single CPU performs all the processes, and a plurality of CPUs may appropriately perform all the processes in cooperation.

The present disclosure may reduce an operation load of a print instruction issued by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A system comprising a print apparatus and an apparatus, wherein the apparatus comprises:
    at least one memory storing a program; and
    at least one processor that when executing the program causes the apparatus to:
    obtain content data based on a voice instruction given by a user to an audio control device, wherein the audio control device executes a first reception process of receiving information on an external access point from a terminal apparatus through a first wireless communication and a second reception process of receiving information on the external access point from the terminal apparatus through a second wireless communication in accordance with Bluetooth, a communication speed of the first wireless communication is faster than that of the second wireless communication, and
    wherein the print apparatus comprises:
    a wireless communication interface configured to communicate to the external access point to which the audio control device connects based on the information on the external access point received in the first reception process or the second reception process;
    at least one memory storing a program;
    at least one processor that when executing the program causes the print apparatus to:
    obtain, via the external access point, print data based on the content data obtained by the apparatus based on the voice instruction given to the audio control device; and
    a print engine configured to print based on the print data.

2. The system according to claim 1, wherein the first wireless communication is based on the IEEE802.11 standard series.

3. The system according to claim 1, wherein the first reception process is executed using an internal access point included in the audio control device and the second reception process is executed using a short distance communication interface included in the audio control device.

4. The system according to claim 1, wherein the audio control device receives a predetermined keyword as a wake word prior to the instruction by the voice.

5. The system according to claim 1, wherein the at least one processor of the print apparatus is further configured to transmit information on a print completion after the print data is obtained by the print apparatus, and
    wherein the audio control device executes a notification indicating completion of printing by audio based on the information on the print completion being transmitted.

6. The system according to claim 1, wherein the at least one processor of the print apparatus is further configured to transmit information on a state of the print apparatus,
    wherein the audio control device executes a notification indicating the state of the print apparatus by audio based on the information on the state of the print apparatus being transmitted.

7. The system according to claim 6, wherein, in a case where an inquiry of a state of the print apparatus by voice of a user is received by the audio control device, a notification indicating the state of the print apparatus is executed by audio.

8. The system according to claim 1, wherein the print process is executed using an ink.

9. The system according to claim 1, wherein the audio control device selectively executes either of the first reception process and the second reception process.

10. The system according to claim 1, wherein the content data is obtained from a storage location.

11. A control method executed by a print apparatus and an apparatus, the method comprising:
obtaining, by the apparatus, content data based on a voice instruction given by a user to an audio control device, wherein the audio control device executes a first reception process of receiving information on an external access point from a terminal apparatus through a first wireless communication and a second reception process of receiving information on the external access point from the terminal apparatus through a second wireless communication in accordance with Bluetooth, a communication speed of the first wireless communication is faster than that of the second wireless communication, and
communicating, by the printing apparatus, to the external access point to which the audio control device connects based on the information on the external access point received in the first reception process or the second reception process;
obtaining, by the printing apparatus via the external access point, print data based on the content data obtained by the apparatus based on the voice instruction given to the audio control device; and
printing, by a print engine, based on the print data.

12. The control method according to claim 11, wherein the first wireless communication is based on the IEEE802.11 standard series.

13. The control method according to claim 11, wherein the first reception process is executed using an internal access point included in the audio control device and the second reception process is executed using a short distance communication interface included in the audio control device.

14. The control method according to claim 11, wherein the audio control device receives a predetermined keyword as a wake word prior to the instruction by the voice.

15. The control method according to claim 11, wherein the at least one processor of the print apparatus is further configured to transmit information on a print completion after the print data is obtained by the print apparatus, and
wherein the audio control device executes a notification indicating completion of printing by audio based on the information on the print completion being transmitted.

16. The control method according to claim 11, wherein the at least one processor of the print apparatus is further configured to transmit information on a state of the print apparatus,
wherein the audio control device executes a notification indicating the state of the print apparatus by audio based on the information on the state of the print apparatus being transmitted.

17. The control method according to claim 16, wherein, in a case where an inquiry of a state of the print apparatus by voice of a user is received by the audio control device, a notification indicating the state of the print apparatus is executed by audio.

18. The control method according to claim 11, wherein the print process is executed using an ink.

19. The control method according to claim 11, wherein the audio control device selectively executes either of the first reception process and the second reception process.

20. The control method according to claim 11, wherein the content data is obtained from a storage location.

21. A system comprising a print apparatus and an apparatus, wherein the apparatus comprises:
at least one memory storing a program; and
at least one processor that when executing the program causes the apparatus to:
obtain content data based on a voice instruction given by a user to an audio control device, wherein the audio control device executes a reception process of receiving information on an external access point from a terminal apparatus through a wireless communication in accordance with Bluetooth, and
wherein the print apparatus comprises:
a wireless communication interface configured to communicate to the external access point to which the audio control device connects based on the information on the external access point received in the reception process;
at least one memory storing a program;
at least one processor that when executing the program causes the print apparatus to:
obtain, via the external access point, print data based on the content data obtained by the apparatus based on the voice instruction given to the audio control device; and
a print engine configured to print based on the print data.

22. The system according to claim 21, wherein the wireless communication unit communicates in accordance with the IEEE802.11 standard series.

23. The system according to claim 21, wherein the reception process is executed using a Bluetooth interface included in the audio control device.

24. The system according to claim 21, wherein the audio control device receives a predetermined keyword as a wake word prior to the instruction by the voice.

25. The system according to claim 21, wherein the at least one processor of the print apparatus is further configured to transmit information on a print completion after the print data is obtained by the print apparatus, and
wherein the audio control device executes a notification indicating completion of printing by audio based on the information on the print completion being transmitted.

26. The system according to claim 21, wherein the at least one processor of the print apparatus is further configured to transmit information on a state of the print apparatus,
wherein the audio control device executes a notification indicating the state of the print apparatus by audio based on the information on the state of the print apparatus being transmitted.

27. The system according to claim 26, wherein, in a case where an inquiry of a state of the print apparatus by voice of a user is received by the audio control device, a notification indicating the state of the print apparatus is executed by audio.

28. The system according to claim 21, wherein the content data is obtained from a storage location.

29. A control method executed by system comprising a print apparatus and an apparatus, the method comprising:
obtaining, by the apparatus, content data based on a voice instruction given by a user to an audio control device, wherein the audio control device executes a reception process of receiving information on an external access point from a terminal apparatus through a wireless communication in accordance with Bluetooth, and
communicating, by the printing apparatus, to the external access point to which the audio control device connects based on the information on the external access point received in the reception process;
obtaining, by the printing apparatus via the external access point, print data based on the content data obtained by the apparatus based on the voice instruction given to the audio control device; and printing, by a print engine, based on the print data.

30. The control method according to claim 29, wherein the print apparatus wirelessly communicate with the external access point in accordance with the IEEE802.11 standard series.

31. The control method according to claim 29, wherein the reception process is executed using a Bluetooth interface included in the audio control device.

32. The control method according to claim 29, wherein the audio control device receives a predetermined keyword as a wake word prior to the instruction by the voice.

33. The control method according to claim 29, wherein the at least one processor of the print apparatus is further configured to transmit information on a print completion after the print data is obtained by the print apparatus, and
wherein the audio control device executes a notification indicating completion of printing by audio based on the information on the print completion being transmitted.

34. The control method according to claim 29, wherein the at least one processor of the print apparatus is further configured to transmit information on a state of the print apparatus,
wherein the audio control device executes a notification indicating the state of the print apparatus by audio based on the information on the state of the print apparatus being transmitted.

35. The control method according to claim 34, wherein, in a case where an inquiry of a state of the print apparatus by voice of a user is received by the audio control device, a notification indicating the state of the print apparatus is executed by audio.

36. The control method according to claim 29, wherein the print process is executed using an ink.

37. The control method according to claim 29, wherein the content data is obtained from a storage location.

* * * * *